May 11, 1965  G. E. EARNHEART  3,182,731
AUTOMATIC COTTON CHOPPER
Filed Oct. 10, 1963  5 Sheets-Sheet 1

George E. Earnheart
INVENTOR.

BY Clarence A. O'Brien
and Harvey B. Jackson
Attorneys

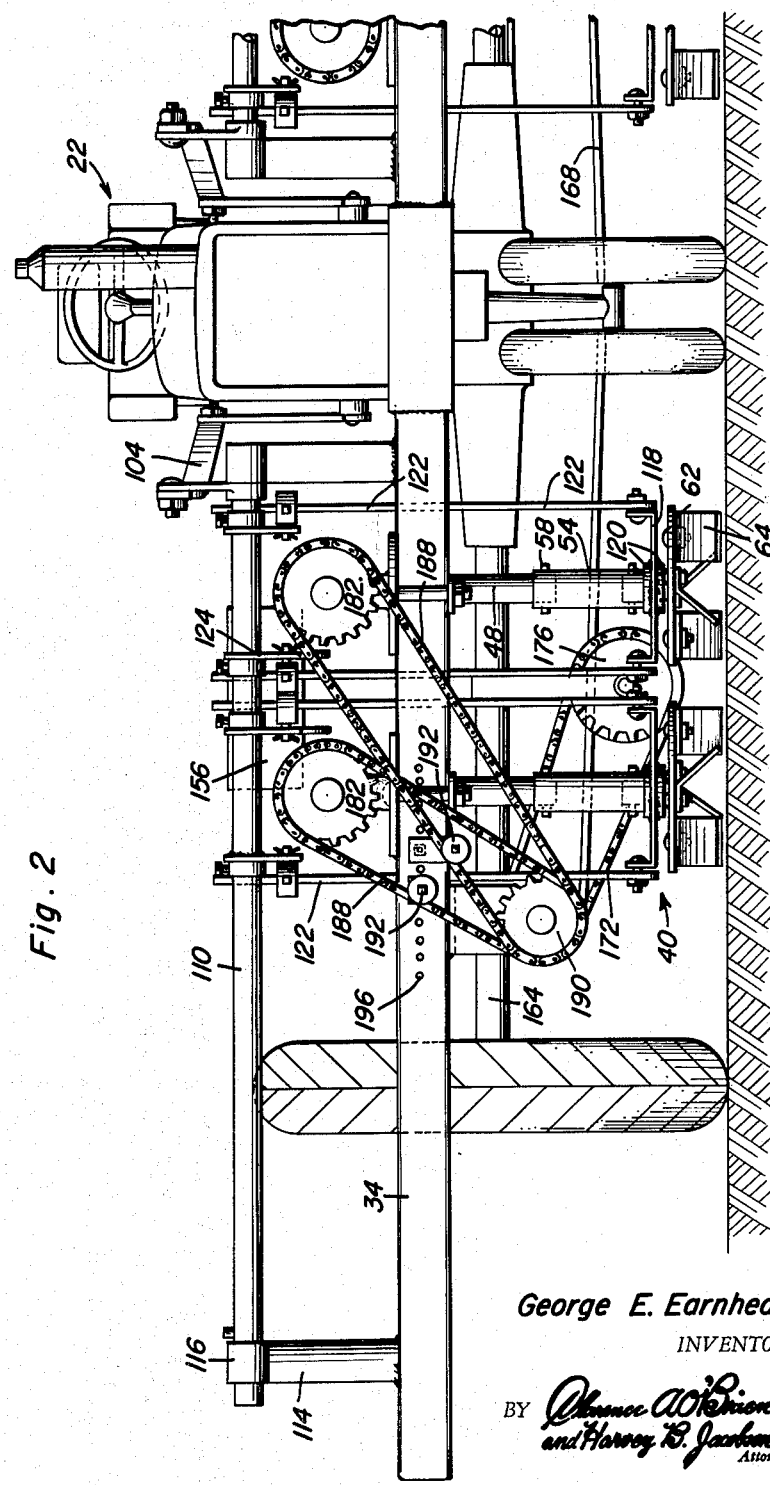

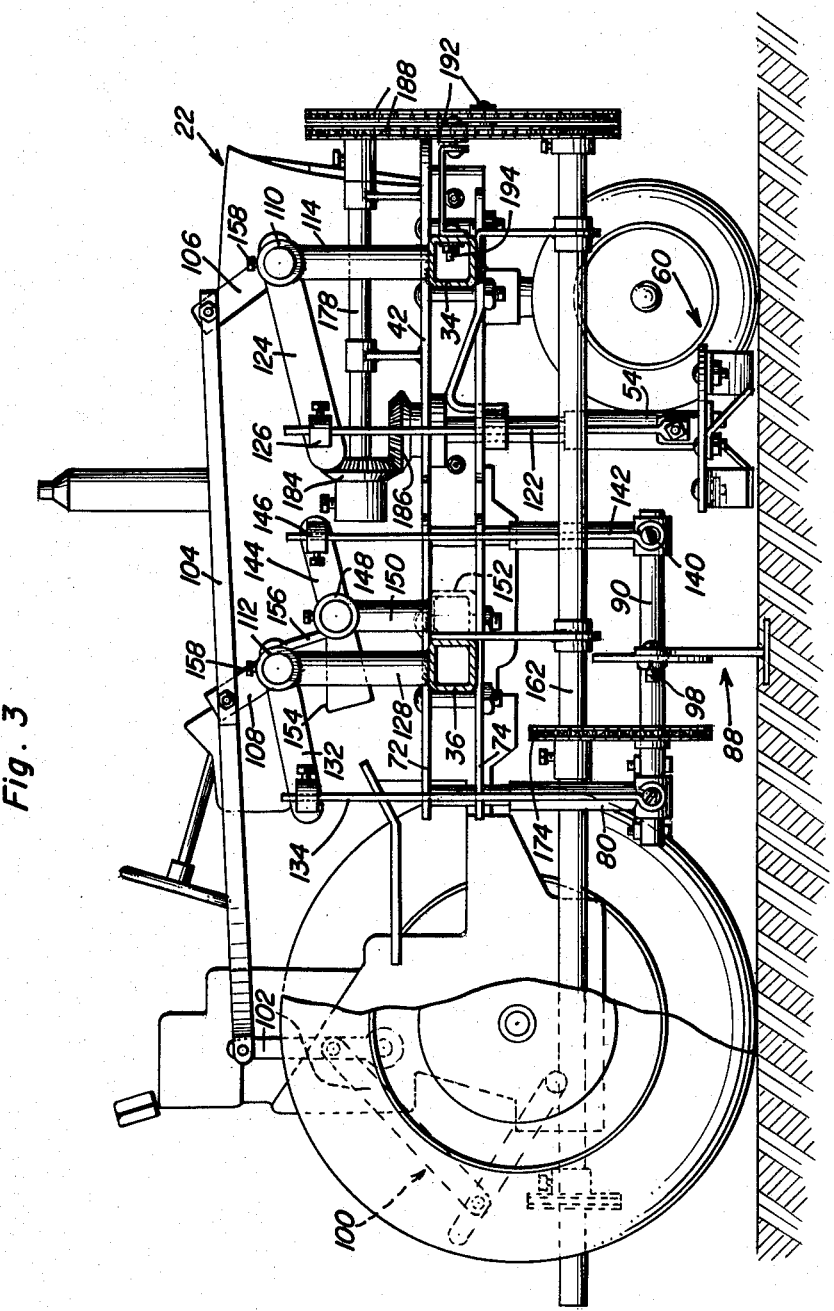

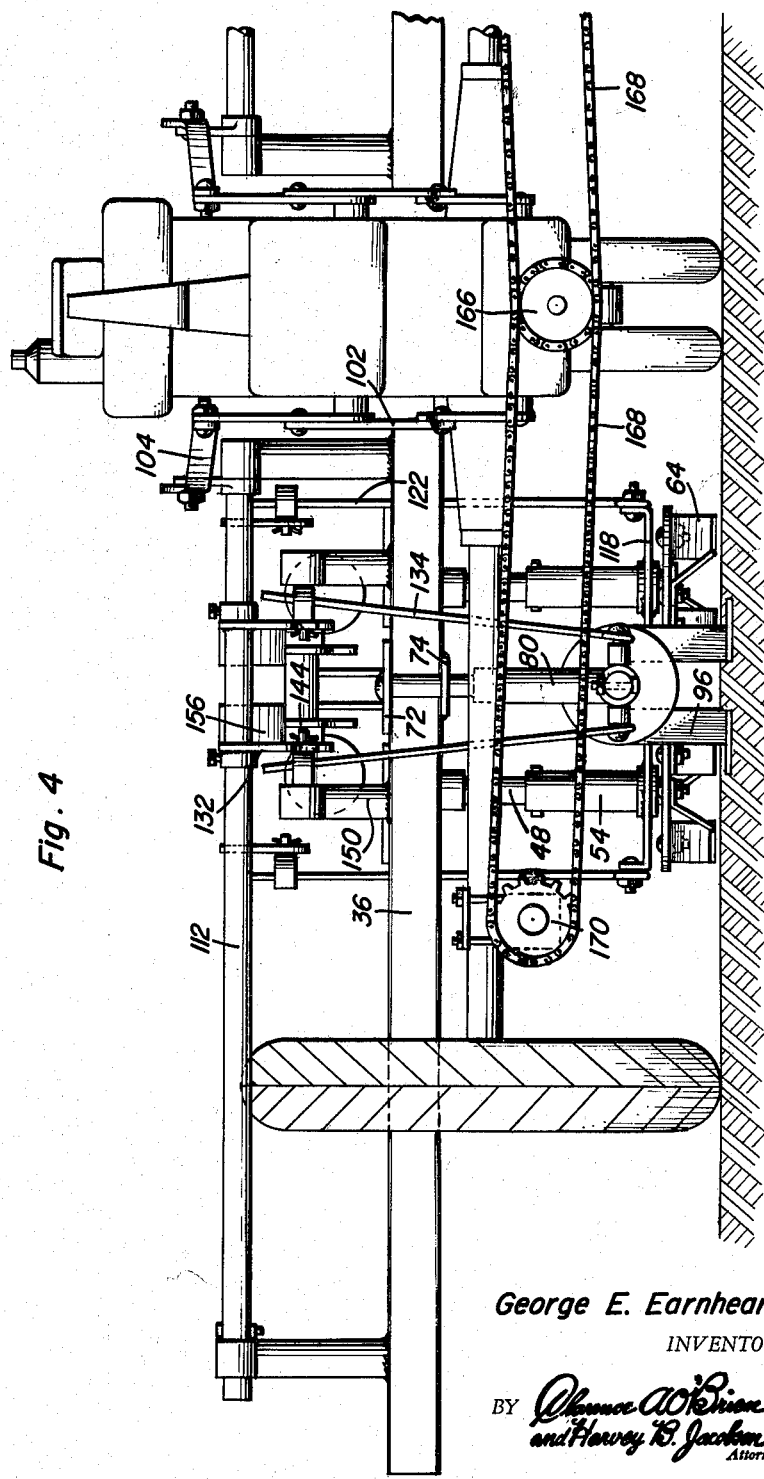

May 11, 1965
G. E. EARNHEART
3,182,731
AUTOMATIC COTTON CHOPPER
Filed Oct. 10, 1963
5 Sheets-Sheet 5
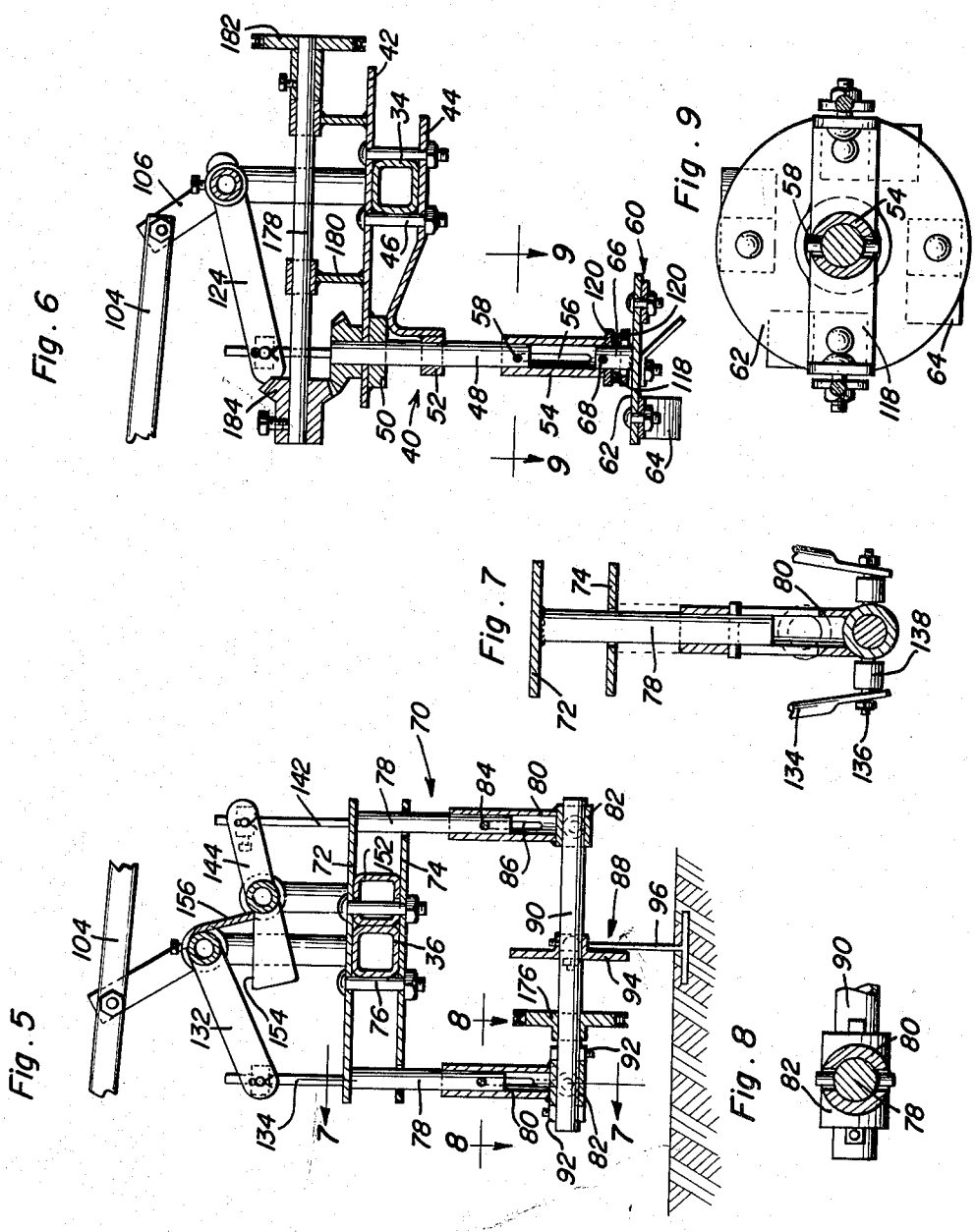
George E. Earnheart
INVENTOR.

United States Patent Office 3,182,731
Patented May 11, 1965

3,182,731
AUTOMATIC COTTON CHOPPER
George E. Earnheart, Foristell, Mo.
(Rte. 1, Fisk, Mo.)
Filed Oct. 10, 1963, Ser. No. 315,311
9 Claims. (Cl. 172—51)

The present invention relates to new and useful improvements in agricultural implements and is more particularly concerned with the provision of a novel device, in the form of a tractor attachment, which is particularly adapted for use in the cultivation of row crops, especially cotton.

It is a primary object of the instant invention to provide a tractor attachment which, upon movement along a row of cotton, will both cut and remove the grass from both sides of the row and thin the row by selectively removing plants through the use of scraper and blocking means.

In conjunction with the above object, it is also intended that the device of the instant invention be capable of carrying means for accommodating any reasonable number of rows, such as for example one to six, as well as various width rows and rows spaced at various distances from each other.

In order to achieve the above object, it is also an object of the instant invention to provide that both the scraper means and the blocking means be adjustable along the length of the frame which extends laterally outward from the tractor on both sides thereof once the attachment is mounted on the tractor.

Further, it is an object of the instant invention to provide a means for automatically and simultaneously raising or lowering both the scraper means and the blocking means so as to immediately accommodate the device to specific conditions.

Also, it is an object of the invention to provide that each scraper means consists of a pair of scraper units each in turn including a plurality of depending scraper blades slightly inclined to the rear of the rotational path taken by each of the scraper units, each unit rotating in an opposite direction from the other unit of the pair.

In addition, the present invention contemplates the provision of a blocker means which includes a plurality of hoe elements pivotally mounted at one end thereof to a rotating disk whereby a positive chopping effect is produced.

Likewise, it is an object of the instant invention to provide an agricultural attachment for a tractor which is relatively simple in construction, of a highly stable nature, capable of being quickly attached to and removed from the tractor with a minimum amount of effort, and completely operable from the tractor, the vertical adjustment of the various units of the attachment being achieved through engagement with the tractor power lift and the driving of the various elements being through the tractor power take-off shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of a tractor and that portion of the attachment projecting laterally from one side of the tractor, both sides of the cultivator attachment being the same;

FIGURE 3 is a side elevational view of the device of the invention;

FIGURE 4 is a rear elevational view of the tractor with that portion of the device projecting laterally from one side thereof as in FIGURE 2;

FIGURE 5 is an enlarged partial cross-sectional view taken substantially on a plane passing along line 5—5 in FIGURE 1;

FIGURE 6 is an enlarged partial cross-sectional view taken substantially along a plane passing along line 6—6 in FIGURE 1;

FIGURE 7 is an enlarged partial cross-sectional view taken substantially on a plane passing along line 7—7 in FIGURE 5;

FIGURE 8 is an enlarged partial cross-sectional view taken substantially on a plane passing along line 8—8 in FIGURE 5; and FIGURE 9 is an enlarged cross-sectional view taken substantially on a plane passing along line 9—9 in FIGURE 6.

Figure 1:
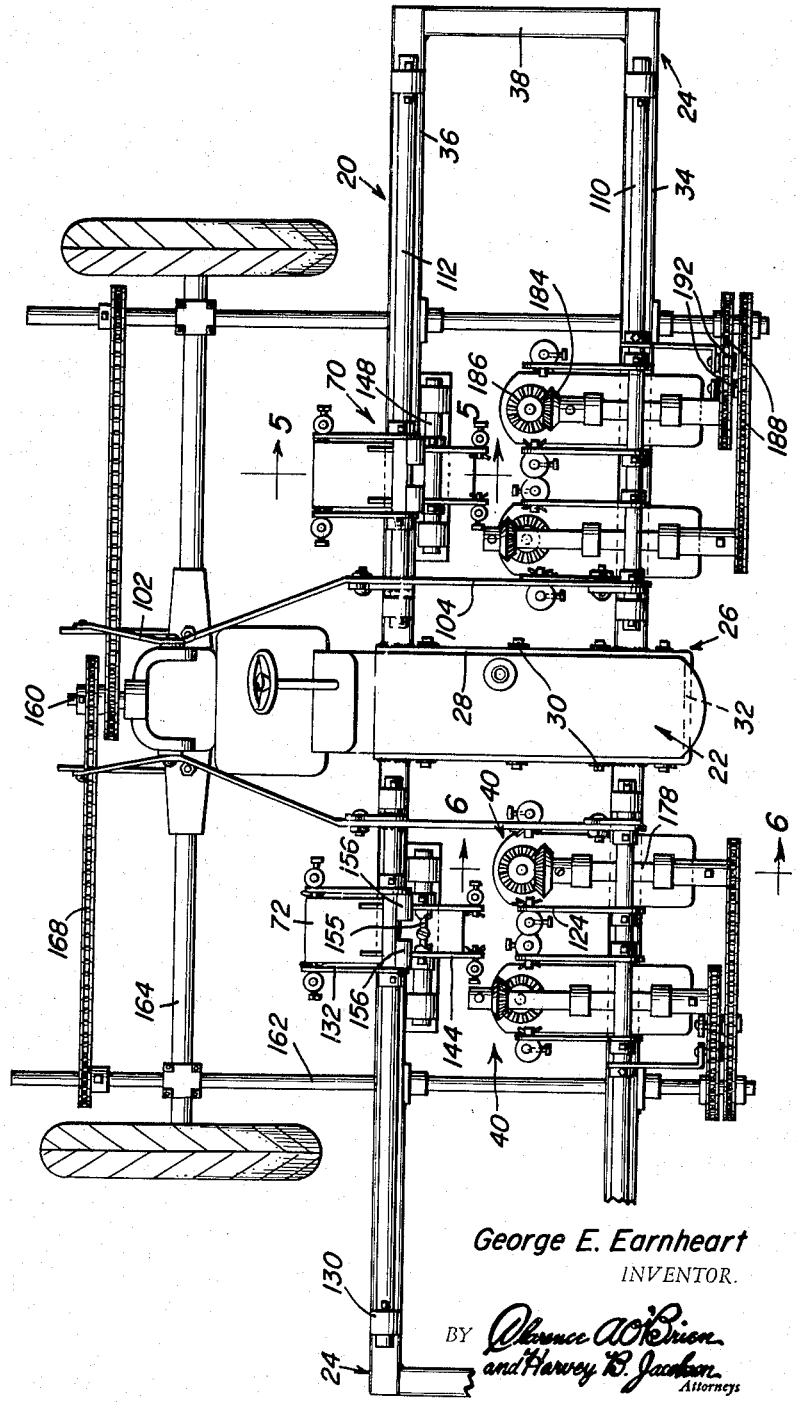
FIGURE 1 is a top plan view of the cultivator attachment of the instant invention mounted upon a tractor.

Referring now more specifically to the drawings, reference numeral 20 is used to generally designate the cultivator attachment comprising the instant invention, this attachment 20 being removably mounted upon a conventional agricultural tractor 22 so as to be carried thereby and operated therefrom.

The cotton cultivating attachment 20 includes an elongated mounting frame consisting in turn of two elongated frame units 24, these units 24, upon a mounting of the attachment 20 on the tractor 22, projecting laterally from opposite sides of the forward portion of the tractor body. The actual mounting of the frame units 24 is achieved through an enlarged mounting bracket 26 capable of straddling the tractor 22 with one mounting plate 28 engaged with each side of the tractor 22 and releasably mounted thereon by siutable means, such as bolts 30. The inner ends of the frame units 24 are rigidly affixed, as by welding, to the outer face o fthe mounting plates 28. As will be appreciated from FIGURE 1, the mounting bracket 26 also includes a transversely extending plate 32 interconnecting the forward ends of the mounting plates 28 and engaging against the front of the tractor 22 so as to further stabilize the frame and assist in properly orientating the bracket 26 about the tractor 22.

Each of the frame units 24, as well as the elements mounted thereon, is a duplicate of the other frame unit 24 and elements, it being contemplated that an equal number of earth-working units be provided on each side of the tractor 22 so as to maintain the balance thereof. Accordingly, only one frame unit 24 will be described in detail along with one set of cultivating elements, it of course being appreciated, as noted supra, that any reasonable number of such sets of elements can be provided on each of the two frame units 24.

Each of the frame units 24 consists of a front beam 34 and a rear beam 36 parallel to and laterally spaced from each other, these beams 34 and 36 having their inner ends welded to the support plates 28 and projecting outwardly therefrom with their outer ends interconnected by an end beam 38. These beams, or at least the front and rear beams 34 and 36, are to be rectangular in cross section, and also preferably hollow so as to obtain a maximum degree of rigidity with a minium amount of weight.

Each of the sets of cultivating elements consists of spader means and blocking means. The spader means consists of a pair of spader units 40 mounted on the front beam 34 in spaced relation to each other, the space therebetween corresponding to the cotton row width. Each of these units 40 is adjustably mounted on the beam 34 by means of a bracket including upper and lower plates 42 and 44 engageable flush against the upper and lower surfaces of the beam 34 and clamped thereto by threaded bolts and nuts 46, an adjustment of the spader unit 40 along the beam 34 being possible by loosening the bolts 46. The upper plate 42 extends both forwardly and rearwardly beyond the beam 34 and is provided with an opening extending vertically through the rear portion thereof for the reception therethrough of a vertical shaft 48, a suitable bushing 50 being provided below the plate 42 surrounding the aperture so as to stabilize the shaft 48 while allowing a free rotation thereof. The bottom plate 44, also projecting rearwardly from the beam 34, is first angled upwardly and then vertically downwardly with the downwardly angled portion having a second bushing or bearing 52, for the shaft 48, secured thereto. The lower end of the shaft 48 is telescopically received within a tube or tubular section 54 and is longitudinally movable therein within limits defined by opposed longitudinally extending slots 56 in the tube 54 and a transversely extending pin 58 projecting through the lower portion of the shaft 48 and out both slots 56. The spader head or earth-engaging portion 60 of the spader unit 40 consists of a flat horizontally orientated disk or plate 62 and a plurality of blades or scrapers 64 releasably fixed to the plate 62 for easy replacement, these blades 64 projecting downwardly and rearwardly relative to the direction of rotation of the spader unit 40, the spader units 40 of each set rotating in opposite directions. In addition, a centrally located vertically projecting stub 66 is affixed to the upper surface of the disk 62 and is fixed within the lower end of the tube 54 by means of a transversely extending pin 68 through opposed apertures within the tube 54 below the slots 56 whereby a rotation of the shaft 48 will cause a simultaneous rotation of the spader head 60.

The blocking means 70 is mounted on the rear beam 36 by a bracket consisting of two flat plates 72 and 74 engaged with the upper and lower surfaces of the beam 36 and projecting forwardly and rearwardly therebeyond, these plates 72 and 74 being clamped to the beam 36 by bolts and nuts 76 which can be loosened so as to achieve a longitudinal adjustment of the blocking means 70 along the beam 36. Rigidly affixed to and depending vertically from the outer end portions of the upper plate 72 is a pair of shafts 78, each shaft 78 extending through an aperture in the lower plate 74 and having the lower portion thereof telescopically slidable within a tube or tubular element 80 which is in turn rigid with a bearing 82. The longitudinal movement of the shafts 78 relative to the tubes 80 is limited by means of, in each instance, a transversely extending pin 84 and opposed elongated slots 86 within the tube 80. The blocking head 88 is fixed to a shaft 90 rotatably supported at opposite ends thereof within the bearings 82 and maintained in position by suitable means such as the collars 92. This blocking head 88 consists basically of a disk or plate 94 and a pair of hoe elements 96 pivotally secured at diametrically opposed points to the disk 94 by bolts 98 so as to swing freely while the shaft 90 is rotated thus effectively chopping or blocking out the cotton plants at predetermined intervals. It will be noted that these hoes 96 each consists of a first flat plate depending from the disk 94 and a transverse plate at the lower end thereof projecting laterally beyond the vertical plate both forwardly thereof and to both sides thereof.

The simultaneous raising and lowering of the scraper units 40 and the blocking unit 70 is to be controlled by the conventionally provided tractor power lift 100 which has a series of pivotally mounted levers 102 for longitudinally moving the elongated lift bar 104 paralleling the tractor 22. The lift bar 104 is pivotally connected, at spaced points therealong, to a pair of lever arms 106 and 108 the opposite ends of which are rigidly affixed, as by welding, to a pair of rotatably mounted elongated rods or shafts 110 and 112.

The rod 110 parallels the front beam 34 and is rotatably supported thereabove by spaced standards 114 having bearings 116 at the upper ends thereof. Each scraper unit 40 is provided with an elongated bearing plate 118 which extends diametrically across the disk 62 and rotatably receives the stub 66, this bearing plate 118 including bearings 120 surrounding the opening therethrough on both the upper and lower surface thereof so as to allow for a smooth rotation of the scraper head 60 relative to the bearing plate 118. Each end of the bearing plate 118 has a vertically extending lift rod 122 pivotally secured thereto, these lift rods 122 extending substantially to the height of the elongated rod 110 and being connected thereto by lever arms 124 which are rigid with the rod 110 and both pivotally and adjustably secured to the upper portions of the lift rods 122 through collars 126 capable of being fixed in a plurality of vertically adjusted positions on the lift rods 122. With such an arrangement, it will be appreciated that a rotation of the rod 110, brought about through a generally longitudinal movement of the lift bar 104, will result in a rotational movement of the lever arm 124 and a vertical movement of the scraper head 60, this being allowed because of the pin and slot connection between the tube 54 and the shaft 48 with the scraper unit 40 being capable of rotational movement in any of its vertically adjusted positions.

The second elongated rod 112 parallels the rear beam 36 and is rotatably supported thereabove by standards 128 provided with bearings 130 at their upper ends. The rod 112 is provided with a pair of spaced rearwardly extending lever arms 132 fixed thereto, the outer end portion of each lever arm 132 being pivotally and adjustably secured to the upper end portion of a vertically depending lift rod 134 which in turn has its lower end pivotally mounted on a laterally projecting stub 136 secured to the rear bearing 82, spacer means 138 being provided as needed. With such an arrangement, it will be appreciated that a vertical adjustment of the rear end of the blocker shaft 90 will be effected upon a rotation of the rod 112 which in turn is effected upon a generally longitudinal movement of the lift bar 104 through the lever arm 108.

In order to effect a simultaneous raising of the forward end of the blocker shaft 90 so as to maintain the shaft 90 horizontal regardless of the vertical position thereof, the bearing 82 supporting the forward end of the shaft 90 is similarly provided with laterally projecting stubs 140 to which are pivotally secured the lower ends of lift rods 142. The vertical movement of these lift rods 142 is effected through a pair of lift rods 144 which are pivotally and vertically adjustably secured to the upper end portions of the rods 142 through collars 146. These lever arms 142 are fixed to a rod 148 rotatably supported below and slightly forward of the elongated rod 112 through standards 150 extending vertically upward from a beam section 152 rigidly affixed to the forward face of the rear beam 36. In regard to the beam section 152, it will be noted that an elongated slot 155 is provided therethrough for a portion of its length so as to allow for the passage of the forward bolt 76 therethrough as well as a varying of the position of the bolt 76 as will be required in adjusting the blocking means 70. The lever arms 144 project rearwardly of the rotatably mounted rod 148 and are provided with an upwardly angled camming edge 154, these camming edges 154 being engaged by the lower edges of plates 156 fixed to and rotatable with the rod 112 so as to effect a rotation of the rod 148 and a vertical adjustment of the forward end of the shaft 90. Incidentally, inasmuch as the scraper units 40 and blocking unit 70 are to be adjusted longitudinally along the beams 34 and 36, it will be appreciated that each of the lever arms 124, 132 and 144 are provided with lock means, for example setscrews 158 for selectively locking the lever arms to their corresponding rods fixedly in any of a plurality of adjusted positions therealong. Further, it should be noted that the camming plates 156 are affixed directly to the end of the lever arm 132 received on the rod 112 for adjustment therewith.

Both the scraper units 40 and the blocking unit 70 are to be driven simultaneously from the power take-off shaft 160 of the tractor 22 with the power being transferred from the power take-off shaft 160 to the various units through a pair of elongated shafts 162 rotatably supported from the front and rear beams 34 and 36, and the rear wheel axle 164 of the tractor 22. The power take-off shaft 160 includes two sprockets 166 with sprocket chains 168 engaged about each sprocket 166 and a corresponding sprocket 170 on the rear end of each rotatable shaft 162. The rotatable blocker shaft 90 is driven directly from the corresponding shaft 162 through a sprocket chain 172 drivingly associated wtih a sprocket 174 fixed to the shaft 162 and a sprocket 176 fixed to the shaft 90.

In order to effect a driving of each of the scraper units 40, an elongated shaft 178 is rotatably supported above and parallel to the top plate 42 by a pair of standards 180, the rotatably mounted shaft 178 having, in each instance, a sprocket 182 fixed to the forward end thereof and a bevel gear 184 fixed to the rear end thereof, this bevel gear 184 meshing with a bevel gear 186 secured to the upwardly projecting end of the scraper shaft 48 whereby a rotation of the shaft 178 will, through the gears 184 and 186 effect a rotation of the shaft 48 about a vertical axis. Rotational movement of the sprocket 182 on the forward end of each of the shafts 178 is effected through a sprocket chain 188 engaged about the sprocket 182 and a corresponding sprocket 190 fixed to the forward end of the shaft 162, it of course being appreciated that two such sprockets 190 are provided, one for each of the scraper units 40. As will be appreciated from FIGURE 1, the bevel gear 184 on each scraper unit 40 is engaged with the bevel gear 186 at a point diametrically opposed from the point of engagement on the other scraper unit 40 so as to produce a rotation of the scraper units 40 in opposite directions thus efficiently cutting the grass on both sides of a row of cotton and throwing this grass outwardly therefrom. Further, inasmuch as the shafts 178 and sprockets 182 will be laterally adjusted along with the scraper units 40, an adjustable idler 192 is provided in conjunction with each sprocket chain 188, this adjustable idler 192 being mounted directly on the front beam 34 in any suitable manner such as by bolt means 194 selectively engaged through any of a plurality of adjusting apertures 196 located in the forward face of the beam 34.

In operation, first the scraper units 40 and blocking unit 70 are laterally adjusted along the frame 20 so as to accommodate the particular width row which is to be blocked. Next, the lever arms 124, 132 and 144 are roughly adjusted on the rods 122, 134 and 142 thus preparing the attachment for automatic operation from the tractor 22. The final vertical adjustment of the various units is achieved through an activation of the tractor power lift which, through the lift bar 104 effects a rotation of the rods 110 and 112 which in turn produces, through the lever arms 124, 132 and 144, a raising or lowering of both the scraper units 40 and the blocking unit 70. After the desired height is achieved, the scraper units 40 and blocking unit 70 are simultaneously driven, from the power take-off shaft 160 of the tractor 22, through a power chain consisting basically of an elongated rotatably mounted shaft 162 extending the full length of the tractor 22, sprocket and chain means driving the blocker shaft 90 directly from the shaft 162, a shaft 178 associated with each scraper unit 40 rotatably driven from the shaft 162 by a sprocket and chain means, and a bevel gear interengagement between the shaft 178 and the shaft 48 for effecting a rotation of the scraping head 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a cotton cultivating attachment for a tractor, a frame mountable on the body of the tractor so as to project laterally therefrom, an elongated rod paralleling said frame and being rotatably supported thereon, scraper means, said scraper means comprising a pair of scraper units spaced from each other along the frame, each scraper unit including a vertical shaft, means rotatably mounting said shaft on the frame, a scraper head, means mounting said head on said shaft for rotation therewith and longitudinal adjustment relative to the longitudinal axis thereof, means for selectively rotating the elongated rod and maintaining the rod in a rotatably adjusted position, and means interconnecting the elongated rod and each scraper head for effecting a vertical adjustment of the scraper head upon a rotation of the rod, said means rotatably mounting the shaft of each scraper unit on the frame being adjustable along the frame for varying the position of the scraper units, said scraper head including a generally horizontal disk and a vertically upwardly extending stub on said disk, said means mounting said head on said shaft including a vertical tubular section telescopically receiving the lower end of the shaft within the upper end thereof, and means allowing limited longitudinal adjustment of the tubular section, the disk stub being fixed to the lower end of the tubular section for adjustment therewith, the means interconnecting the elongated rod and each scraper head including a bearing plate, said bearing plate rotatably receiving the stub and being generally fixed against longitudinal movement relative to the stub, lift rod means secured to the bearing plate and extending vertically therefrom to approximately the height of the elongated rod, lever arm means having one end thereof fixed to the elongated rod and projecting therefrom toward the lift rod means, and means pivotally fixing the other end of said lever arm means to the lift rod means, said pivotally fixing means being vertically adjustable along said lift rod means.

2. The cotton cultivating attachment of claim 1 including cotton blocking means, means mounting said blocking means on said frame rearward of said scraper means, and means for effecting a vertical adjustment of the blocking means.

3. The cotton cultivating attachment of claim 2 wherein said means mounting the blocking means on the frame consists of a blocker shaft generally aligned centrally between the scraper units and rearward thereof, means rotatably receiving each end of the blocker shaft, each of these last mentioned means including a vertical guide tube projecting upwardly therefrom, a pair of guide posts fixed to the frame and depending therefrom, each guide tube receiving a guide post and being vertically adjustable therealong.

4. The cotton cultivating attachment of claim 3 wherein the means for effecting the vertical adjustment of the blocking means comprises a second elongated rod paralleling said first mentioned elongated rod and being rotatably mounted on the frame, lift rod means secured to the means receiving each end of the blocker shaft, a lever arm fixed at one end to the second elongated rod and pivotally secured at its other end to the lift rod means at one end of the blocker shaft whereby a rotation of the second elongated rod will effect a vertical movement of said one end of the blocker shaft, a third rod rotatably mounted on the frame parallel to the second elongated rod, a lever arm fixed to the third rod and pivotally secured at one end to the lift rod means at the other end of the blocker shaft whereby a rotation of the third rod will effect a vertical movement of the other end of the blocker shaft, and means engaged between the second elongated rod and the third rod for effecting a corresponding rotation of the third rod upon a rotation of the second elongated rod.

5. The cotton cultivating attachment of claim 4 wherein said blocking means consists of a blocker disk mounted on and rotatable with the blocker shaft, and a plurality of hoe elements pivotally mounted on said blocker disk and projecting generally radially therefrom.

6. The cotton cultivating attachment of claim 3 wherein said blocking means consists of a blocker disk mounted on and rotatable with the blocker shaft, and a plurality of hoe elements pivotally mounted on said blocker disk and projecting generally radially therefrom.

7. In a cotton cultivating attachment for a tractor, a frame mountable on the body of the tractor so as to project laterally therefrom, an elongated rod paralleling said frame and being rotatably supported thereon, scraper means, said scraper means comprising a pair of scraper units spaced from each other along the frame, each scraper unit including a vertical shaft, means rotatably mounting said shaft on the frame, a scraper head, means mounting said head on said shaft for rotation therewith and longitudinal adjustment relative to the longitudinal axis thereof, means for selectively rotating the elongated rod and maintaining the rod in a rotatably adjusted position, means interconnecting the elongated rod and each scraper head for effecting a vertical adjustment of the scraper head upon a rotation of the rod, cotton blocking means, means mounting said blocking means on said frame rearward of said scraper means, and means for effecting a vertical adjustment of the blocking means, said means mounting the blocking means on the frame consisting of a blocker shaft generally aligned centrally between the scraper units and rearward thereof, means rotatably receiving each end of the blocker shaft, each of these last mentioned means including a vertical guide tube projecting upwardly therefrom, and a pair of guide posts fixed to the frame and depending therefrom, each guide tube receiving a guide post and being vertically adjustable therealong, said means for effecting the vertical adjustment of the blocking means comprising a second elongated rod paralleling said first mentioned elongated rod and being rotatably mounted on the frame, lift rod means secured to the means receiving each end of the blocker shaft, a lever arm fixed at one end to the second elongated rod and pivotally secured at its other end to the lift rod means at one end of the blocker shaft whereby a rotation of the second elongated rod will effect a vertical movement of said one end of the blocker shaft, a third rod rotatably mounted on the frame parallel to the second elongated rod, a lever arm fixed to the third rod and pivotally secured at one end to the lift rod means at the other end of the blocker shaft whereby a rotation of the third rod will effect a vertical movement of the other end of the blocker shaft, and means engaged between the second elongated rod and the third rod for effecting a corresponding rotation of the third rod upon a rotation of the second elongated rod.

8. The cotton cultivating attachment of claim 7 wherein said blocking means consists of a blocker disk mounted on and rotatable with the blocker shaft, and a plurality of hoe elements pivotally mounted on said blocker disk and projecting generally radially therefrom for free swinging movement upon rotation of the blocker disk.

9. In a cotton cultivating attachment for a tractor, a frame mountable on the body of the tractor so as to project therefrom, cotton blocking means, means mounting said blocking means on said frame, and means for effecting a vertical adjustment of the blocking means, said means mounting the blocking means on the frame consisting of a blocker shaft, means rotatably receiving each end of the blocker shaft, each of these last mentioned means including a vertical guide tube projecting upwardly therefrom, and a pair of guide posts fixed to the frame and depending therefrom, each guide tube receiving a guide post and being vertically adjustable therealong, said means for effecting the vertical adjustment of the blocking means comprising a first elongated rod rotatably mounted on the frame, lift rod means secured to the means receiving each end of the blocker shaft, a lever arm fixed at one end to the first elongated rod and pivotally secured at its other end to the lift rod means at one end of the blocker shaft whereby a rotation of the first elongated rod will effect a vertical movement of said one end of the blocker shaft, a second rod rotatably mounted on the frame parallel to the first elongated rod, a lever arm fixed to the second rod and pivotally secured at one end to the lift rod means at the other end of the blocker shaft whereby a rotation of the second rod will effect a vertical movement of the other end of the blocker shaft, and means engaged between the first elongated rod and the second rod for effecting a corresponding rotation of the second rod upon a rotation of the first elongated rod.

References Cited by the Examiner

UNITED STATES PATENTS

| | | | |
|---|---|---|---|
| 96,562 | 11/69 | Draughon | 172—51 |
| 261,327 | 7/82 | Ferree | 172—111 |
| 1,253,307 | 1/18 | Tveten | 172—59 |
| 1,674,551 | 6/28 | Hutchins | 172—108 X |
| 2,048,196 | 7/36 | Phillips | 172—58 |
| 2,502,468 | 4/50 | Marihart | 172—108 X |
| 2,720,740 | 10/55 | Price | 56—6 X |

FOREIGN PATENTS

| | | |
|---|---|---|
| 1,007,221 | 2/52 | France. |
| 37,306 | 10/86 | Germany. |

ABRAHAM G. STONE, *Primary Examiner.*